United States Patent Office 3,063,993
Patented Nov. 13, 1962

3,063,993
17α-(2 - CARBOXYETHYL) - 7,17β - DIHYDROXYANDROST-4-EN-3-ONE γ-LACTONES AND ESTERS THEREOF
Robert C. Tweit, Wilmette, Ill., assignor to G. D. Searle & Co., Chicago, Ill., a corporation of Delaware
No Drawing. Filed Dec. 22, 1961, Ser. No. 161,444
5 Claims. (Cl. 260—239.57)

This invention relates to 17α-(2-carboxyethyl)-7,17β-dihydroxyandrost-4-en-3-one γ-lactones and esters thereof, as also processes whereby these lactones and their esters can be prepared. More particularly, this invention relates to new and useful chemical compounds having the formula

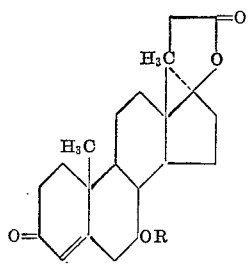

wherein OR represents a hydroxy or alkanoyloxy substituent in the 7-position, either α or β, of the cyclopentanopolyhydrophenanthrene nucleus enformulated.

Among the alkanoyloxy radicals represented by OR, especially lower alkanoyloxy radicals are preferred, which is to say radicals having the formula

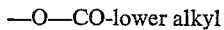

—O—CO-lower alkyl the lower alkyl constituent being such as methyl, ethyl, propyl, isopropyl, butyl, isobutyl, sec-butyl, tert-butyl, pentyl, neopentyl, hexyl, isohexyl, heptyl, or like saturated, monovalent, acyclic, straight- or branched-chain, hydrocarbon groupings having the formula

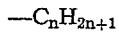

—$C_nH_{2n+1}$ wherein n represents a positive integer less than 8.

Equivalent to the foregoing lactones and their esters for the purposes of this invention are the corresponding hydroxy acids and their alkali salts of the formula

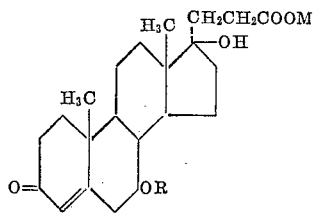

wherein OR is defined as before and M represents hydrogen, an alkali metal, or the ammonium radical.

The compounds to which this invention relates are useful because of their valuable pharmacological properties. Thus, for example, they are characterized by a wholly unexpected capacity to antagonize the metrotropic response to estrogen; and, further, they block the effect of desoxycorticosterone acetate on urinary sodium and potassium.

Preparation of the 7-hydroxy compounds hereof proceeds by fermentation of 17α-(2-carboxyethyl)-17β-hydroxyandrost-4-en-3-one γ-lactone with either *Gelasinospora tetraspora* or a species of *Gliocladium*, depending on whether α or β configuration of the 7-hydroxy is desired; and the resultant alcohols, in turn, are converted to corresponding esters hereof by heating with pyridine and an appropriate alkanoic acid anhydride.

The fermentative procedure is carried out in a suitably nutritive medium preliminarily inoculated with the apposite culture and maintained at about 25° with agitation under aerobic conditions conducive to the development of submerged growth. The starting material to be hydroxylated is preferably added to the fluorishing culture in solution—for example, in acetone or propylene glycol—whereupon the fermentation is continued as before until such time as the hydroxylation is substantially complete—representatively, after upwards of 24 hours. The fermentation medium is then extracted with an appropriate solvent, such as dichloromethane, and the desired product obtained as the residue following vacuum distillation.

Those skilled in the art will appreciate that the salts set forth above readily devolve from the corresponding lactones on contact with aqueous alkali, and the free acids are obtained from the salts by a critically brief exposure to a proton source. Prolongation of the exposure time induces lactonization.

The following examples describe in detail compounds illustrative of the present invention and methods whereby these compounds can be prepared. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are at 25° and referred to the D line of sodium.

EXAMPLE 1

*17α - (2 - carboxyethyl) - 7β,17β - dihydroxyandrost-4-en-3-one γ-lactone.*—A stainless steel fermentation tank is charged with a nutrient medium containing, per 1000 parts of tap water, 33 parts of dextrose, 5 parts of commercial cotton seed meal flour, 3 parts of corn steep liquor, and 2 parts of silicone anti-foam emulsion. Tank and medium are sterilized by heating to temperatures in the range, 110–120°, and then cooled to about 25°, whereupon the medium is inoculated with an aqueous homogenized culture of *Gliocladium* sp. A.T.C.C. 14513. The medium is maintained at about 25° for 29 hours, during which time a stream of sterile air is passed through, and the developing culture is agitated to produce submerged growth. Sufficient 17α-(2-carboxyethyl)-17β-hydroxyandrost-4-en-3-one γ-lactone (U.S. 2,705,712) dissolved in a minimal quantity of acetone is then introduced to bring the concentration of lactone to 1 part per 3000 parts of medium. Agitation with aeration at about 25° is thereupon resumed for 12 hours, at the end of which time the resultant mixture is extracted with dichloromethane. The extract is dried over anhydrous sodium sulfate and stripped of solvent by distillation. The residue is rinsed with hexane and then taken up in benzene and chromatographed on silica gel, using benzene and ethyl acetate as developing solvents. From an eluate comprising 40% ethyl acetate in benzene, upon evaporation of solvent, is obtained an oil which crystallizes when acetone is added thereto. This crystalline material is 17α-(2-carboxyethyl) - 7β,17β - dihydroxyandrost- 4 - en - 3 - one γ-lactone which, recovered on a filter and dried in air, melts at 174–177° and has a specific rotation of +66°. The product has the formula

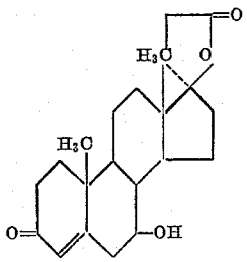

EXAMPLE 2

7β - acetoxy - 17α - (2 - carboxyethyl) - 17β - hydroxyandrost-4-en-3-one γ-lactone.—A solution of 7 parts of 17α - (2 - carboxyethyl) 17β,17β - dihydroxyandrost - 4-en-3-one γ-lactone in a mixture of 30 parts of pyridine and 20 parts of acetic anhydride is allowed to stand at room temperatures for 18 hours, then poured onto ice. A solid forms which is separated by filtration and recrystallized from a mixture of acetone and ether to give 7β - acetoxy - 17α - (2 - carboxyethyl) - 17β - hydroxyandrost-4-en-3-one γ-lactone melting at approximately 216–217° and with a specific rotation of +69°. The product has the formula

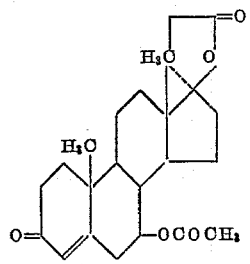

EXAMPLE 3

17α - (2 - carboxyethyl) - 7α,17β - dihydroxyandrost-4-en-3-one γ-lactone.—A stainless steel fermentation tank is charged with a nutrient medium containing, per 1000 parts of tap water, 33 parts of dextrose, 5 parts of commercial cotton seed meal flour, 3 parts of corn steep liquor, and 2 parts of silicone anti-foam emulsion. Tank and medium are sterilized by heating to temperatures in the range, 110–120°, and then cooled to about 25°, whereupon the medium is inoculated with an aqueous homogenized culture of *Gelasinospora tetraspora* A.T.C.C. 14512. The medium is maintained at about 25° for 29 hours, during which time a stream of sterile air is passed through and the developing culture is agitated to produce submerged growth. Sufficient 17α-(2-carboxyethyl)-17β-hydroxyandrost-4-en-3-one γ-lactone dissolved in a minimal quantity of acetone is then introduced to bring the concentration of lactone to 1 part per 3000 parts of medium. Agitation with aeration at about 25° is thereupon resumed for 12 hours, at the end of which time the resultant mixture is extracted with dichloromethane. The extract is dried over anhydrous sodium sulfate and stripped of solvent by distillation. The residue is washed by trituration with ether and then three times crystallized from a mixture of ethyl acetate and ether to give 17α-(2-carboxyethyl)-17α,17β-dihydroxyandrost-4-en - 3 - one γ - lactone melting at 268–270° with decomposition and having a specific rotation of +43.7°. The product has the formula

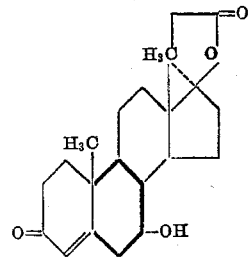

EXAMPLE 4

7α - acetoxy - 17α - (2 - carboxyethyl) - 17β - hydroxyandrost-4-en-3-one γ-lactone.—A mixture of 1 part of 17α - (2 - carboxyethyl) - 7α,17β - dihydroxyandrost - 4-en-3-one γ-lactone, 8 parts of pyridine, and 4 parts of acetic anhydride is let stand overnight at room temperatures and then poured into water. The aqueous supernatant layer of the resultant mixture is decanted off, and the residue is dried and successively crystallized from aqueous methanol and a mixture of acetone and ether to give 7α - acetoxy - 17α - (2 - carboxyethyl) - 17β - hydroxyandrost-4-en-3-one γ-lactone melting at 152–156°. The product has the formula

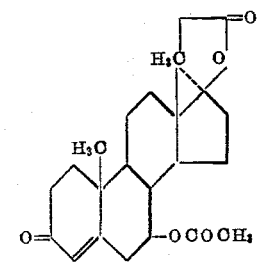

What is claimed is:
1. A compound of the formula

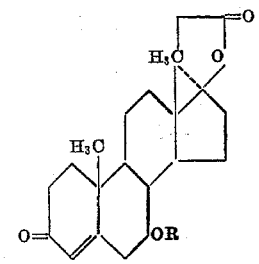

wherein the substituent in the 7-position represented by OR is selected from the group consisting of hydroxy and lower alkanoyloxy radicals.

2. 17α - (2 - carboxyethyl) - 7β,17β - dihydroxyandrost-4-en-3-one γ-lactone.

3. 7β - acetoxy - 17α - (2 - carboxyethyl) - 17β - hydroxyandrost-4-en-3-one γ-lactone.

4. 17α - (2 - carboxyethyl) - 7α,17β - dihydroxyandrost-4-en-3-one γ-lactone.

5. 7α - acetoxy - 17α - (2 - carboxyethyl) - 17β - hydroxyandrost-4-en-3-one γ-lactone.

No references cited.

UNITED STATES PATENT OFFICE
CERTIFICATE OF CORRECTION

Patent No. 3,063,993                           November 13, 1962

Robert C. Tweit

It is hereby certified that error appears in the above numbered patent requiring correction and that the said Letters Patent should read as corrected below.

Column 1, lines 18 to 28, column 3, lines 4 to 14, and lines 29 to 39, and column 4, lines 4 to 14, lines 29 to 39, and lines 42 to 52, for that portion of each formula reading

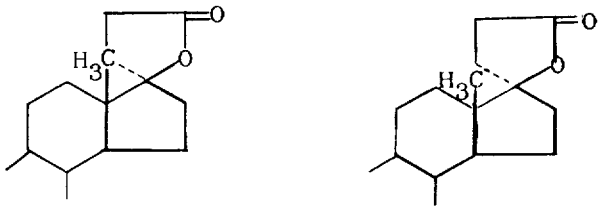

column 3, line 18, for "17β,17β-" read -- 7β,17β- --; line 65, for "-17α,17β-" read -- -7α,17β- --.

Signed and sealed this 31st day of December 1963.

(SEAL)
Attest:
ERNEST W. SWIDER

Attesting Officer

EDWIN L. REYNOLDS
Acting Commissioner of Patents